July 1, 1969

I. COHEN ET AL 3,452,636

WEATHER RESISTANT FASTENER ASSEMBLY

Filed June 15, 1967

Irvin Cohen
Bernard D. Levy
INVENTORS

BY Clarence A. O'Brien
and Harvey B. Jacobson
Attorneys 3,452,636
WEATHER RESISTANT FASTENER ASSEMBLY
Irvin Cohen, Reading, and Bernard D. Levy, Pittsburgh, Pa., assignors to Construction Fasteners, Inc., a corporation of Pennsylvania
Filed June 15, 1967, Ser. No. 646,399
Int. Cl. F16b *35/00, 43/00;* F16j *15/00*
U.S. Cl. 85—1               8 Claims

ABSTRACT OF THE DISCLOSURE

An assembly of a headed screw, a rigid dome-shaped washer loosely received on the threaded shank of the screw and a sealing washer frictionally held on the screw shank and seated in the rigid washer. An axial projection on the rigid washer forms an annular edge abutting the head of the screw to avoid contact between the head and the exposed external surface of the rigid washer.

Background of the invention

This invention relates to fastener assemblies utilized in the building trades specifically designed to seal the openings formed by the fasteners in the parts fastened thereby and resist the adverse affects of weather to which the fastener assembly is exposed.

Fastener assemblies of the aforementioned type involve an externally threaded screw member having a head portion through which torque is applied so as to thread the shank through the structural members being fastened, together with a relatively rigid washer against which the head bears and a relatively resilient sealing washer seated underneath the rigid washer deformed during installation so as to form a liquid-tight seal about the opening in the structural members through which the threaded shank extends.

In order to obtain successful fastening of parts as well as a successful seal, the materials from which the components of the fastener assembly are made, must of course be properly selected including the selection of the metal for the screw and rigid washer such as a proper steel or aluminum and suitable resilient sealing material for the sealing washer such as neoprene. Further, the relative dimensions of the components must be selected for strength purposes and to fill voids between the rigid washer and the structural part by the material of the resilient sealing washer. However, all of such efforts at obtaining a desired sealed fastening, is lost if the installed fastener assembly is susceptible to corrosion at any point which ultimately results in sealing failure.

Sealing failure due to corrosion very often cannot be avoided no matter how carefully the components of the fastener assembly are designed because of poor fastener installing practices and use of unskilled labor. One particular problem in this regard, involves marring or scratching of the external corrosion resisting surface of the rigid washer that protectively encloses the fastener opening therebelow. Such scratching of the rigid washer surface occurs for example because of over-torquing and this problem becomes particularly critical where the corrosion resisting surface of the rigid washer is formed by a coating such as paint.

Excessive torquing of the screw fastener during installation, may also cause unintentional deformation of the rigid washer and development of water trapping pockets on its surface rendering it more susceptible to corrosion.

Another problem in the installation of fastener assemblies of the aforementioned type arises from use of power tools to torque the screw member. Very often, prematurely developed friction between the screw head and the rigid washer prevents coaxial seating of the resilient washer on the panel surface resulting in asymmetrical radial distortion of the resilient washer. Bonding of the resilient washer to the rigid washer is sometimes resorted to for this reason.

The present invention is therefore directed toward installational problems and a critical source of sealing failure in connection with fastener assemblies of the aforementioned type. Toward this end, the rigid washer associated with the fastener assembly is provided with an axial projection engaging the head of the screw member so as to form a relatively thin annular edge surface in frictional contact with the head of the screw during installation. As a result of this edge formation friction is reduced and contact between the head and most of the external surface of the rigid washer is avoided even during installation by unskilled personnel. Thus, scratching of the corrosion resisting surface and removal or crushing of paint coatings if utilized, is eliminated to thereby also eliminate a source of sealing failure due to corrosion.

Further, the axial edge surface formation associated with the rigid washer component of the fastener assembly, in cooperation with the other components confines the area through which axial force is applied to the rigid washer when torquing the screw in order to avoid unintentional deformation of the rigid washer and asymmetrical distortion of the resilient washer particularly where the resilient washer is not bonded to the rigid washer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
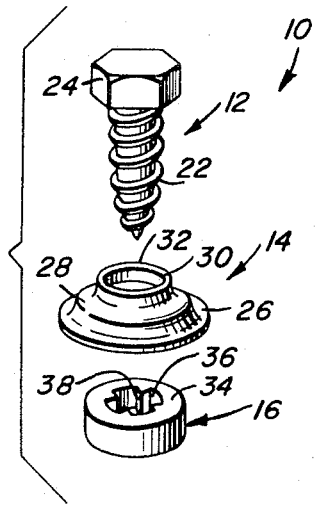
FIGURE 1 is a perspective view showing the disassembled components which form the fastener assembly of the present invention.

Referring now to the drawings in detail, it will be observed that the fastener assembly which is generally denoted by reference numeral 10 is made up of three basic components consisting of a metal screw member generally referred to by reference numeral 12, a rigid metal washer 14 and a resilient sealing washer 16 made of a sealant material. The fastener assembly is adapted to fasten two structural parts such as the overlapping roof panels 18 and 20 as shown in FIGURES 2 and 3.

The screw member 12 is made of a suitable metal and includes an externally threaded shank portion 22 preferably of the self-tapping type so that a substantial amount of torque must be transmitted thereto for forming the threaded openings in the panels 18 and 20 being fastened. Formed integral with the threaded shank portion 22 is a head portion 24 through which torque is transmitted when a tool such as wrench is applied thereto. The shank portion 22 of the screw member extends loosely through the rigid metal washer 14 assembled in abutting relation to the head portion 24 and also extends through the resilient washer 16 which is frictionally held on the shank portion as will be hereafter explained.

Figure 2:
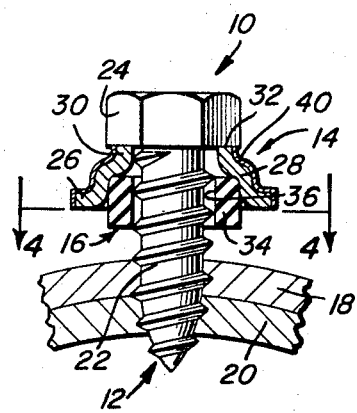
FIGURE 2 is a side sectional view through the fastener assembly with the components thereof assembled during an initial phase of installation.
Figure 3:
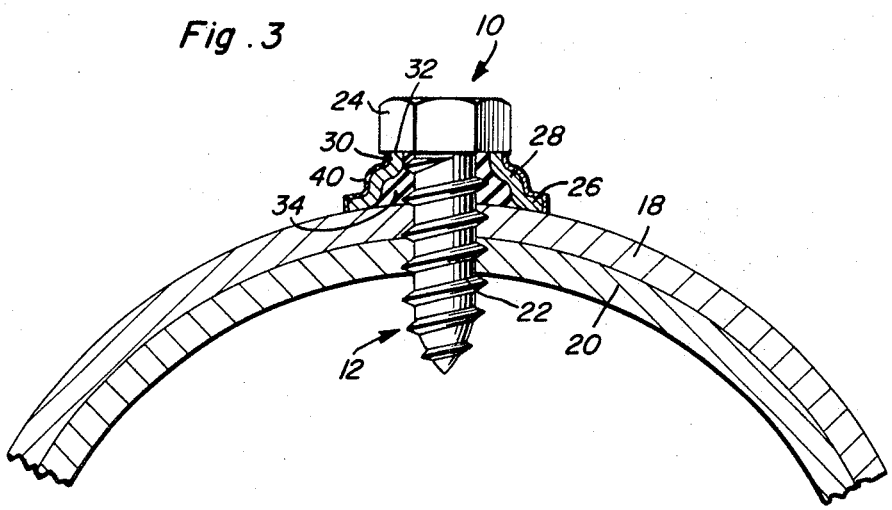
FIGURE 3 is a side sectional view through the fastener assembly in a fully installed condition.

The rigid washer 14 is of the dome type and includes a laterally extending, peripheral rim portion 26 adapted to be clamped against the outer surface of the panel 18 as shown in FIGURE 3. The outer diameter of the peripheral rim portion 26 exceeds the diameter of the head portion 24 and is connected by means of a curved dome portion 28 to an axially projecting edge portion 30 having an annular edge surface 32 adapted to abut the head portion 24 of the screw member as shown in FIGURES 2 and 3. It will also be observed, that the washer 14 is of substantially constant thickness so as to enclose an annular space about the screw shank below the edge portion 30, the outer diameter of which is less than the outer diameter of the head portion 24 with which it is engaged. On the other hand, the internal diameter of the edge portion which is the minimum internal diameter of the rigid washer 14, is dimensioned to loosely receive the shank portion 22 of the screw member. It will be apparent therefore, that axial force is applied to the rigid washer along the edge surface 32 by means of the head portion of the screw member in order to clamp the rigid retainer against the outer surface of the panel 18 thereby enclosing the opening formed therein. The openings are formed either by prior drilling and tapping or by the self-threading action of the screw shank 22.

Figure 4:
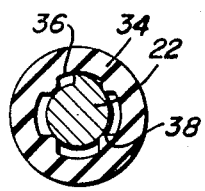
FIGURE 4 is a transverse sectional view taken substantially through a plane indicated by section line 4—4 in FIGURE 2.

The resilient washer 16 which may be formed from a cylindrical body of sealant material 34 such as neoprene, is seated within the annular space enclosed by the dome portion 28 of the rigid washer as shown in FIGURE 2 when the components of the fastener assembly are assembled prior to installation with the resilient washer in substantial alignment with the annular edge 32 as shown in FIGURE 2. The outer diameter of the resilient washer is therefore dimensioned accordingly and is therefore less than the outer diameter of the rigid washer 14. The inner diameter of the internal surface 36 is dimensioned to receive the shank portion 22 therethrough so as to avoid shearing of the sealant material by the threads of the shank portion during installation. The resilient washer is however frictionally held in coaxial assembled relation on the shank portion by a plurality of projections 38 that extend radially inwardly into engagement with the threads from the internal surface 36 as more clearly seen in FIGURE 4. Also, the resilient washer is dimensioned in axial length so as to extend from the dome portion 28 of the rigid retainer beyond the peripheral rim portion 26 by a predetermined amount prior to installation as shown in FIGURE 2. The amount of material 34 in the resilient washer is sufficient to fill all spaces below the internal surface of the rigid washer and below the head portion 24 of the screw member, some of the material possibly also extending below the peripheral rim portion 26 of the rigid washer when installation is completed.

It will be apparent from the foregoing, that because of the axial projection 30 on the rigid washer 14, marring or scratching of the external surface of the rigid washer 14 is precluded. This surface may be so formed as to be corrosive resistant or it may be coated with a corrosion resisting material such as paint 40 as shown in FIGURES 2 and 3. A critical source of sealing failure is thereby eliminated. Also, since the annular head engaging surface 32 on the rigid washer is substantially smaller than the cross-sectional area of the resilient washer and remains constant, an increase in friction between the screw head and the rigid washer sufficient to stop "spinning" of the rigid washer while torque is initially applied, is avoided in order to insure coaxial seating of the resilient washer about the screw member. Poor installation resulting from asymmetrical deformation of the resilient washer is thereby precluded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A weather resistant fastener assembly for structural parts, comprising a screw member having a threaded shank portion and a torque transmitting head portion including a planar bearing surface, a relatively rigid one-piece washer having a central opening receiving the shank portion and having a dome portion enclosing an annular space about the shank portion, a peripheral rim portion extending laterally of the dame portion of an outer diameter exceeding that of the head portion, and an annular edge portion extending axially from the dome portion with the inner and outer surfaces thereof being substantially parallel to the axis of the screw member, said annular edge portion having an outer diameter less than that of the head portion, said annular edge portion being assembled in contact with the bearing surface on the head portion of the screw member and having an internal diameter greater than the shank portion loosely extending through the rigid washer, and a resilient sealing washer received in the annular space enclosed by the dome portion of the rigid washer having an external diameter less than that of the rigid washer and an internal diameter dimensioned to receive the threaded shank portion therethrough, said resilient washer projecting axially from the dome portion beyond the peripheral rim portion of the rigid washer, whereby the resilient washer is symmetrically deformed into contact with the head portion radially between the annular edge portion and the shank portion of screw member when clamped between a part and the rigid washer in response to threading of the screw member through the part by torque applied to the head portion, said annular edge portion presenting a frictional surface abutting the head portion which remains constant in area during installation of the fastener assembly.

2. The combination of claim 1 wherein said threaded shank portion is of the self-tapping type and said resilient washer is provided with a plurality of projections internally thereof engaging the shank portion to frictionally hold the washers in assembled coaxial relation on the shank portion prior to installation.

3. The combination of claim 2 wherein said rigid washer is provided with an external, corrosion resisting surface protected from contact with the head portion of the screw member by the annular edge portion.

4. The combination of claim 3 wherein said external surface of the rigid washer is coated with a corrosion resisting material.

5. The combination of claim 1 wherein said rigid washer is provided with an external, corrosion resisting surface protected from contact with the head portion of the screw member by the annular edge portion.

6. The combination of claim 5 wherein said external surface of the rigid washer is coated with a corrosion resisting material.

7. The combination of claim 1 wherein said annular edge portion of the rigid washer forms a frictional contact surface of fixed area engaged by the head portion and substantially smaller than the cross-sectional area of the resilient washer with which the contact surface is aligned.

8. The combination of claim 7 wherein said rigid washer is provided with an external, corrosion resisting surface protected from contact with the head portion of the screw member by the annular edge portion.

References Cited

UNITED STATES PATENTS

| | | | |
|---|---|---|---|
| 2,326,455 | 8/1943 | Gray | 85—50 |
| 2,765,834 | 10/1956 | Poupitch | 85—1 |
| 2,917,819 | 12/1959 | Britton et al. | 85—1 |
| 3,062,557 | 11/1962 | Underwood | 85—1 |
| 3,160,054 | 12/1964 | Cohen et al. | 85—1 |

FOREIGN PATENTS 892,870  4/1962  Great Britain.

CARL W. TOMLIN, *Primary Examiner.*

RAMON S. BRITTS, *Assistant Examiner.*

U.S. Cl. X.R.

85—50; 277—166; 287—189.36